United States Patent [19]

Bergkvist

[11] Patent Number: 4,970,628

[45] Date of Patent: Nov. 13, 1990

[54] HEADLAMP FOR AUTOMOTIVE VEHICLES

[75] Inventor: Lars A. Bergkvist, Själevad, Sweden

[73] Assignee: Labino Patent AB, Själeyid, Sweden

[21] Appl. No.: 375,027

[22] PCT Filed: Oct. 13, 1988

[86] PCT No.: PCT/SE88/00534

§ 371 Date: Jun. 16, 1989

§ 102(e) Date: Jun. 16, 1989

[87] PCT Pub. No.: WO89/03778

PCT Pub. Date: May 5, 1989

[30] Foreign Application Priority Data

Oct. 22, 1987 [SE] Sweden ............................... 8704118

[51] Int. Cl.[5] ............................................. B60Q 1/04

[52] U.S. Cl. ...................................... 362/61; 362/263; 362/293

[58] Field of Search ................... 362/61, 80, 263, 293, 362/307, 310

[56] References Cited

U.S. PATENT DOCUMENTS

| | | | |
|---|---|---|---|
| 1,655,761 | 1/1928 | Duffy | 362/293 X |
| 2,382,939 | 8/1945 | Koch | 362/293 X |

FOREIGN PATENT DOCUMENTS

| | | |
|---|---|---|
| 2249930 | 4/1974 | Fed. Rep. of Germany . |
| 2422347 | 11/1975 | Fed. Rep. of Germany . |
| 819881 | 10/1937 | France . |
| 2585304 | 1/1987 | France . |

*Primary Examiner*—Stephen F. Husar
*Attorney, Agent, or Firm*—Nies, Kurz, Bergert & Tamburro

[57] ABSTRACT

A vehicle headlamp comprises a reflector and a headlamp glass constructed to produce a so-called full beam lobe when a light source is located in a predetermined position in relation to the reflector. The invention is characterized in that the light source (11) is constructed to transmit both a large proportion of visible light and a large proportion of ultraviolet light, and in that a filter (19; 22; 23) is located in the beam path of the headlamp and is effective in filtering that part of the light emitted by the light source (11) which gives rise to a light lobe corresponding to the difference between a so-called full beam lobe and a so-called dipped beam lobe. The headlamp is further characterized in that the filter (19; 22; 23) is constructed firstly to filter light so that substantially no light within the visible light spectrum will be transmitted through the filter, and secondly to transmit ultraviolet light.

8 Claims, 1 Drawing Sheet

HEADLAMP FOR AUTOMOTIVE VEHICLES

BACKGROUND OF THE INVENTION

The present invention relates to a headlamp for automotive vehicles.

Automotive vehicles, such as cars, are normally provided with main headlights which are constructed to emit a full beam image, or high beam image, and a dipped beam image, or low beam image. For at least 15 years, vehicles have been fitted with halogen headlamps in order to increase the light yield.

It is a generally known problem that while the full beam of a vehicle headlamp will illuminate the surroundings well ahead of the vehicle in darkness, the beam will also dazzle the occupants of any oncoming vehicle. On the other hand, whereas the dipped beam will not have the same dazzling effect on oncoming vehicles, it does not illuminate the surroundings ahead of the vehicle to a satisfactory extent. Normally, however, the extent of illumination afforded by a dipped beam is adequate enough to enable the driver to see the road sufficiently well to drive the vehicle.

However, the ability to discern roadside objects, such as road signs and other fixtures, or pedestrians etc., is greatly impaired when driving on dipped headlights rather than on full beam.

Since the illuminating lobe of a dipped headlight with appreciable light intensity, is not higher than about 0.5 to 1 meter above the road surface, the light reflected from the road sign or other roadside object is often too weak to be discerned readily by the occupants of the vehicle. The distances at which safety reflectors carried by pedestrians can be observed safely are also much shorter when the vehicle is on dipped headlights than when driven on full beam.

The light yield could be increased still further, by replacing the conventional halogen headlamps with gas discharge lamps.

One drawback with gas discharge lamps, however, is that their ignition time is of such long duration as to render it impossible to switch rapidly between full beam and dipped beam.

A progressively increasing desire in this respect is one of fitting to automotive vehicles lamps capable of emitting ultraviolet light. This light causes a large number of different colours to fluoresce to greater and lesser extents. In recent times it has become more and more usual to utilize so-called day-glow inks on signs etc., i.e. inks which when irradiated with ultraviolet light (UV) will transmit visible light. Roadside objects are today painted with such day-glow inks and paints. Furthermore, some emergency vehicles have broad strips painted thereon in day-glow colours. Light-coloured clothing will also fluoresce well when illuminated with ultraviolet light.

If it were possible for a vehicle to transmit ultraviolet light, it would render the painting of road signs, roadside demarcation posts, etc. with a fully or partially day-glow paint more viable than is now the case, from a road safety aspect.

However, as beforementioned, the use of gas discharge lamps which emit a high proportion of ultraviolet light is seriously encumbered by the long ignition times of such lamps.

SUMMARY OF THE INVENTION

The present invention offers a solution which will fulfill the aforesaid desideratum, where the dependency of the long ignition times of gas discharge lamps has been eliminated.

Accordingly, this invention relates to a vehicle headlamp that comprises a reflector and a headlamp glass which are constructed to produce a so-called full beam lobe when a light source is located in a predetermined position in relation to the reflector, said headlamp being characterized in that the light source is constructed to emit both a large proportion of visible light and a large proportion of ultraviolet light; in that located in the beam path of the lamp is a filter which is intended to filter that part of the light emitted by the light source which will give rise to a light lobe corresponding to the difference between a so-called full beam lobe and a so-called dipped beam lobe; and in that the filter is constructed firstly to filter light so that substantially no light within the visible light spectrum will be transmitted through the filter and secondly to transmit ultraviolet light.

The invention will now be described in more detail with reference to exemplifying embodiments thereof illustrated in the accompanying drawings, in which

DETAILED DESCRIPTION OF THE PREFERRED EMBODIMENTS

Figure 1:
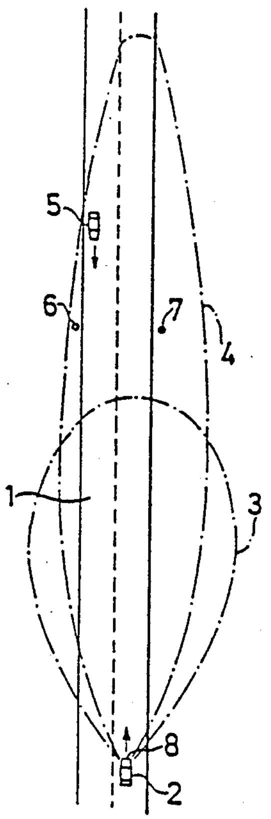
FIGS. 1 and 2 illustrate schematically light lobes produced by the dipped and full beams respectively of a vehicle.
Figure 2:
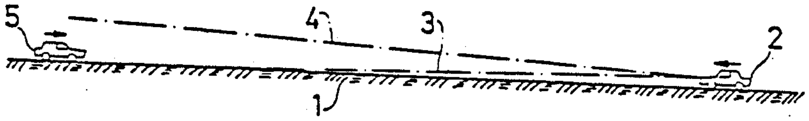

FIGS. 1 and 2 illustrate a road surface 1 and a car 2 which travels in the direction of the arrow shown when seen in the horizontal plane, the lobe of a low beam or dipped beam may have the appearance indicated by phantom line 3, whereas the lobe of a full beam or high beam may have the appearance indicated by phantom line 4. FIG. 2 illustrates corresponding lobes 3, 4 seen in the vertical plane. As illustrated, a normal dipped beam has a relatively short and broad lobe, the vertical extension of which does not extend to more than 0.5–1 meter above the road surface. A full beam has a narrower and longer lobe, the vertical extension of which is significantly more than one meter above the road surface.

The inventive headlamp is constructed and fitted to the vehicle so that visible light and ultraviolet light are emitted in the schematically illustrated lobe 3, corresponding to a dipped beam lobe, and so that ultraviolet light, substantially in the absence of visible light, is emitted in a light lobe corresponding to the difference between the full beam lobe 4 and the dipped beam lobe 3.

Figure 3:
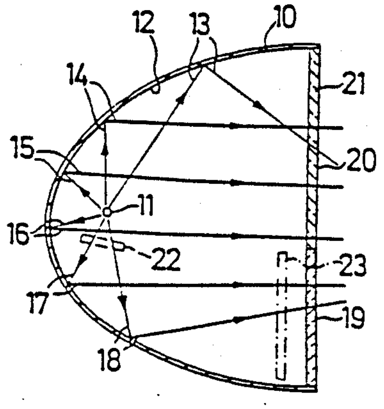
FIG. 3 is a schematic cross-section of a headlamp and illustrates three different embodiments of the invention.
Figure 4:
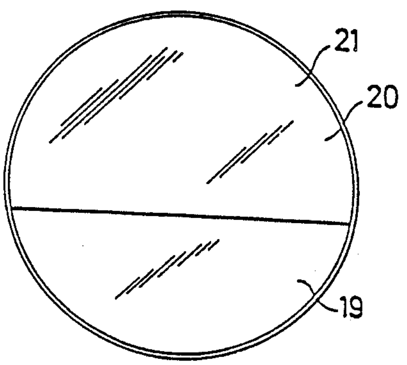
FIG. 4 illustrates a headlamp glass seen from the right of FIG. 3, according to a first inventive embodiment.

FIG. 3 is a cross-sectional view of a headlamp 10 constructed in accordance with the invention.

The light source 11 of the headlamp 10 is a gas discharge lamp, preferably a mercury vapour discharge lamp, which will produce both a large proportion of visible light and a large proportion of ultraviolet light. Other known types of electrical discharge lamps are conceivable.

The ultraviolet light will preferably have a wave length in a fluorescence activating .range of 360–370 nanometers.

The headlamp reflector 12 is configured so that together with the headlamp glass it will produce a full beam image when the light source 11 is located in a predetermined position relative to the reflector. The reference 13 identifies those light rays which impinge on the road surface at a closer distance to the vehicle, i.e. light rays which together with approximately horizontal light rays 14,15, 16 result in a typical dipped beam lobe 3. The references 17,18 identify those light rays which typically produce the light lobe which distinguishes the full beam lobe from the dipped beam lobe, i.e. the light contained by the lobe 4 minus the light contained by the lobe 3.

In accordance with the invention, there is positioned in the beam path of the headlamp, a filter which is effective in filtering that part of the light emitted by the light source which gives rise to a light lobe corresponding to the difference between the so-called full beam lobe and the so-called dipped beam lobe. The filter is constructed to filter the light so that firstly substantially no light within the visible light spectrum will be transmitted through the filter and secondly ultraviolet is transmitted.

According to a first embodiment of the invention, the filter comprises an integral part 19 of the headlamp glass 20. The remaining part 21 of the headlamp glass consists of conventional headlamp glass.

The filter 19 may comprise any filter suitable for the purpose intended, although a filter made of Woods glass is preferred.

Since a mercury vapour discharge lamp is used, the light yield is very high. Despite producing a high proportion of ultraviolet light, the intensity of the visible light emitted will correspond to the intensity produced by a conventional halogen lamp.

It has been said in the aforegoing that the visible light is filtered out by the filter. A greater or lesser part of the visible light will be transmitted through the filter, however, depending on the constriction of the filter.

According to the invention, however, substantially no light which lies within the visible light spectrum is transmitted through the filter.

By "substantially no light which lies within the visible light spectrum" is mean there and in the following claims that the intensity of any visible light that may be present will lack all significance in respect of the application in question For example, when the invention is applied in automobiles this definition implies that any visible light present will not have a troublesome effect on the driver of an oncoming vehicle.

According to a second embodiment of the invention, the filter is placed in the beam path between the light source 11 and the headlamp glass 20.

FIG. 3 illustrates two different variants according to said second embodiment. According to a first variant a filter 22 is placed between the light source 11 and the reflector 12, this filter 22 being shown in phantom lines in FIG. 3.

According to a second variant, a filter 23 is placed between the reflector 12 and the inner surface of the headlamp glass 20, this filter 23 being shown in phantom lines in FIG. 3.

Thus, a headlamp which is constructed in accordance with the invention will transmit a dipped beam lobe of visible and ultraviolet light together with ultraviolet light in a lobe which corresponds substantially to the difference between a full beam lobe and a dipped beam lobe.

As beforementioned, the ultraviolet light activates day-glow paints, and consequently objects which are painted with such paints or which incorporate day-glow inks or colouring substances will be illuminated when located within the light lobe of the ultraviolet light. The driver of a vehicle will observe such objects despite said objects being located in an area not irradiated by visible light. Thus, in the case of the FIG. 1 example, the lights of the vehicle 1 will not dazzle the driver of the vehicle 5 while objects 6, 7 which are located outside the light lobe of the dipped beams of the vehicle 1 will be illuminated for the driver of said vehicle. Naturally, the ultraviolet light in the dipped beam lobe will assist the driver in noticing objects within the dipped beam lobe more readily. These objects 6, 7 may, for instance, be road signs or pedestrians wearing clothes which carry day-glow colours.

As mentioned in the introduction, a multiple of different objects are today painted in day-glow colours, so that they can be more readily noticed in daylight. The use of day-glow paints or colours can be expected to increase.

In addition hereto a large number of materials used in clothes are day-glowing in the sense that when irradiated with ultraviolet light they transmit light of a longer wave length, i.e. visible light. The majority of synthetic fibre materials, for instance, are day-glowing.

It will be obvious that the inventive headlamp can be switched on continuously while the vehicle is driven in darkness. In other words, the headlamp need not be dimmed.

When the invention is applied in automobiles, however, the automobile will preferably be fitted with a conventional halogen headlamp which produces a full beam lobe. Naturally, this additional headlamp must be dimmed when two vehicles meet.

Despite dimming the further headlamp, however, the headlamp constructed in accordance with the present invention will enable the driver of a vehicle to discern much more readily objects that are located within the area illuminated by the additional headlamp.

It will be understood that the filter can be made from a material other than Woods glass, such as any material capable of filtering out visible light but transmitting ultraviolet light. It will also be understood that the configuration of the filter and the positioning thereof can be different to that illustrated in FIG. 3.

Consequently, the present invention shall be not be considered to be limited to the afore described embodiments, since variations and modifications can be made within the scope of the following claims.

I claim:

1. A vehicle headlamp comprising: in combination, a reflector, a headlamp glass and a light source, said combination being structurally arranged so that the beam path from the light source produces a full beam lobe with said light source located in a predetermined position in relation to said reflector, and wherein said light source (11) emits both a large proportion of visible light and a large proportion of ultraviolet light; and a filter (19; 22; 23) is disposed in the combination and fixed in the beam path of the headlamp in a location wherein that part of the light emitted by the light source (11) which gives rise to a light beam lobe, corresponding to the difference between a full beam lobe and a dipped beam lobe, passes through said filter; and said filter (19; 22; 23) being constructed of material which will filter light so that substantially no light within the visible light spectrum is transmitted through the filter, and so that ultraviolet light will pass through said filter.

2. A headlamp according to claim 1, wherein said filter (19) forms an integral part of the headlamp glass (20) of said headlamp.

3. A headlamp according to claim 1, wherein said filter (22; 23) is located in at least a part of the beam path between the light source (11) and through the headlamp glass.

4. A headlamp according to claim 1, wherein said light source (11) comprises a gas discharge lamp.

5. A headlamp according to claim 4, wherein said light source (11) is constructed to emit a large proportion of light within the wave length range of 360 to 370 nanometers, and a large proportion of light within the visible light spectrum.

6. A headlamp according to claim 3, wherein said filter is located between the light source and the reflector in the path of said part of the light emitted by the light source.

7. A headlamp according to claim 3, wherein aid filter is located between the reflector and the headlamp glass in the path of said part of the light emitted by the light source.

8. A headlamp according to claim 4, wherein said light source comprises a mercury vapour discharge lamp.

* * * * *

UNITED STATES PATENT AND TRADEMARK OFFICE
CERTIFICATE OF CORRECTION

PATENT NO. : 4,970,628

DATED : November 13, 1990

INVENTOR(S) : Lars A. Bergkvist

It is certified that error appears in the above-identified patent and that said Letters Patent is hereby corrected as shown below:

Column 3, line 47, change "mean" to --meant--.

Signed and Sealed this

Tenth Day of March, 1992

*Attest:*

HARRY F. MANBECK, JR.

*Attesting Officer* *Commissioner of Patents and Trademarks*